United States Patent [19]

Noguchi

[11] 4,118,672

[45] Oct. 3, 1978

[54] ATTENUATION EQUALIZER HAVING CONSTANT RESISTANCE

[75] Inventor: Tsutomu Noguchi, Tokyo, Japan

[73] Assignee: Nippon Electric Company, Ltd., Tokyo, Japan

[21] Appl. No.: 819,066

[22] Filed: Jul. 26, 1977

[30] Foreign Application Priority Data

Jul. 28, 1976 [JP] Japan .................................. 51/90077
Jul. 28, 1976 [JP] Japan .................................. 51/90078

[51] Int. Cl.² .............................................. H03F 3/60
[52] U.S. Cl. ...................................... 330/286; 330/56; 330/304; 331/107 R; 333/33
[58] Field of Search .................. 330/53, 56, 286, 304, 330/287; 333/33, 28 R; 331/107 R

[56] References Cited

U.S. PATENT DOCUMENTS

| 3,372,350 | 3/1968 | Kawahashi et al. .................. 333/28 |
| 3,569,869 | 3/1971 | Sutton .................................. 333/28 X |
| 3,965,445 | 6/1976 | Ou ........................................ 333/33 |
| 4,028,637 | 6/1977 | Gewartowski .................. 330/287 X |

Primary Examiner—James B. Mullins
Attorney, Agent, or Firm—Hopgood, Calimafde, Kalil, Blaustein & Lieberman

[57] ABSTRACT

An attenuation equalizer, having a constant resistance is comprised of a distributed constant line having a given impedance and electrical length connected to both the input and output terminals of the equalizer, and an additional constant line having a given impedance and electrical length connected to the input and output terminals through resistors of a given resistance.

24 Claims, 16 Drawing Figures

ATTENUATION EQUALIZER HAVING CONSTANT RESISTANCE

FIELD OF THE INVENTION

This invention generally relates to an attenuation equalizer having a constant resistance, and more particularly to an attenuation equalizer which is suitable for use in micro-wave and millimeter wave, apparatus.

DESCRIPTION OF THE PRIOR ART

At the present time, gain slope compensations are required in the field of broad frequency bandwidth apparatus of micro-wave or millimeter wave communication systems. For this reason, various types of attenuation equalizers are used. A conventional attenuation equalizer disclosed in Japanese Patent Application Disclosure No. 49-83354 consists of lumped capacitors and lumped inductors as shown in FIG. 1. The attenuation equalizer shown in FIG. 1 includes series and parallel resonance circuits consisting of lumped capacitors 1, 1', inductors 2, 2', and two resistors 3. FIG. 2 shows an arrangement of a transistor amplifier, in which the above attenuation equalizer is employed as a slope compensating circuit. This is a high output power transistor amplifier consisting of a slope-fine-adjusting resonator A, a large compensating bridged T type filter, namely an attenuation equalizer B, an input matching circuit C for a transistor D, and an interstage matching circuit E. The interstage matching circuit E, resonator A and bridged T type equalizer B smooths the gain, while the bridged T type equalizer B, serving as a constant resistance circuit, improves the input impedance.

However, it is difficult, in the microwave frequency range accurately prepare the lumped capacitors and the lumped inductors for the specific values required. In addition, when these elements are incorporated into a circuit, there is also incurred a parasitic capacitance, which results in deviation of these values from the specifically designed values. Moreover loss in the lumped capacitors and lumped inductors is increased, so that the insertion loss in the equalizer circuit is also increased.

In other prior art, there has been proposed a mismatching method for flattening the frequency characteristic without using an attenuation equalizer. For example, a transitor gain in a high frequency region is inclined relative to the frequency so that slope compensation is required. The result is that a frequency characteristic can be flattened by utilizing the reflection due to mismatching of input and/or output impedances. However, this mismatching method cannot be used when the input and output impedances must be adjusted to optimum values. Therefore the aforesaid method does not provide an adequate solution.

Slope compensation, due to mismatching, is possible among elements such as transistors, or among respective stages, but the mismatching method fails to achieve considerable slope compensation over a wide band, in addition to the difficulty in achieving high output power.

It is an object of the present invention to provide an attenuation equalizer having a constant resistance which avoids the shortcomings of the prior art equalizers, is simple in design had less insertion loss.

It is another object of the present invention to provide an attenuation equalizer having a constant resistance for use in the microwave and millimeter wave region, which is suited for gain slope compensation provided by amplifying elements such as transistors.

It is a further object of the present invention to provide an attenuation equalizer having a constant resistance, which may effectively attenuate a higher harmonic component of oscillating elements such as an IMPACT diode, and also suppress unwanted oscillation.

SUMMARY OF THE INVENTION

According to the present invention, there is provided an attenuation equalizer having a constant resistance, comprised of a distributed constant line, having a given impedance and electrical length, connected to both input and output terminals of the attenuation equalizer, and another distributed constant line having a given impedance and electrical length, connected to the input and output terminals through resistors having a given resistance.

More particularly, according to the features of the present invention, an attenuation equalizer is comprised of a distributed constant line connected to both input and output terminals of the attenuation equalizer, and another distributed constant line connected to the input and output terminals through resistors and provided with stabs connected to its ends.

Furthermore, according to the features of the present invention, the following equations (1), (2), and (3) are satisfied, where the impedances and the electrical lengths of the two distributed constant lines are represented by $Z_1$, $Z_2$ and $\theta_1$, $\theta_2$, respectively, and the resistance of the resistors are represented by R, while a load impedance $Z_L$ is connected at the output terminal of the equalizer;

$$\theta_1 = \theta_2 = \theta \qquad (1)$$

$$Z_1^2 = R \cdot Z_L^2/(R - Z_L) \qquad (2)$$

$$Z_2^2 = R(R - Z_L) \qquad (3)$$

According to the features of the present invention, $Z_1$, $Z_2$, and R are equal to the values obtained from the above equations (2) and (3) or are within ±25% of these values, and $\theta_1$ and $\theta_2$ are equal to or within ±5% from the values obtained from the above equation (1).

It is another feature of the present invention, that in the case where the values of $\theta_1$ and $\theta_2$ vary beyond a range of ±5% of the ideal values, the opposite ends of the distributed constant line are provided with stabs for the adjustment of the electrical length.

It is a further feature of the present invention that, one distributed constant line is formed on a first dielectric substrate and the other distributed constant line is formed on a second dielectric substrate having a dielectric constant higher than that of the first substrate.

Furthermore, according to the features of the present invention, one of the distributed constant lines, formed on the dielectric substrate, is provided with two or more auxiliary lines, one of which is used to constitute the above mentioned distributed line, thereby varying the electrical length of that distributed constant line. In this case, according to the features of the invention, the other distributed constant line, the stab lines and a ground electrode are provided on a dielectric substrate, which are interconnected, as required.

It is another feature of the present invention that, at least one of input and output terminals is connected to an amplifying element such as a transistor, via a matching network.

It is a further feature of the present invention that, an input terminal of the attenuation equalizer is connected to a resonator, while the output terminal is connected to an amplifying element such as a transistor via a matching network.

Furthermore, according to the features of the present invention, the input terminal of the attenuation equalizer is connected to an output end of an oscillating element, such as an IMPATT diode or the like.

In the attenuation equalizer of this present invention, there are primarily provided distributed constant lines, and resistors are simply added thereto, thus allowing a simple arrangement, design and manufacture. Therefore, this attenuation equalizer is well suited for practical applications and enjoys wide use.

In addition, for achieving practically constant resistance (input, output impedance) over a wide range of frequency, input side and output side V.S.W.R. values are required to have a value not more than 1.2 over a broad frequency bandwidth, when input and output terminals are connected to input and output signal lines having fixed characteristic impedance. This requirement can be easily satisfied in the equalizer of this invention.

Furthermore, when the circuit according to the present invention is connected to an input or output terminal of an amplifying element, such as a transistor, then there may achieved a wide band slope compensating circuit, so that the transistor amplifier may be used over a wide band while having a low noise level.

Yet furthermore, when the circuit according to the invention is connected to an output terminal of an oscillator such as IMPATT diode, then high frequency components alone may be effectively eliminated, thereby providing a stable oscillator using the circuit according to the invention.

These and other objects and advantages of the present invention will appear more fully upon consideration of the various illustrative embodiments now to be described in connection with the accompanying drawings.

DESCRIPTION OF THE PREFERRED EMBODIMENTS

Figure 1:
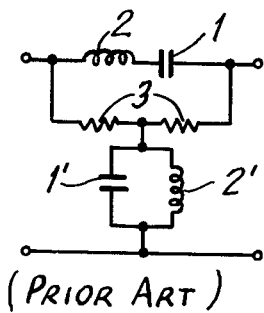
FIG. 1 is a circuit diagram of a prior art attenuation equalizer.
Figure 2:
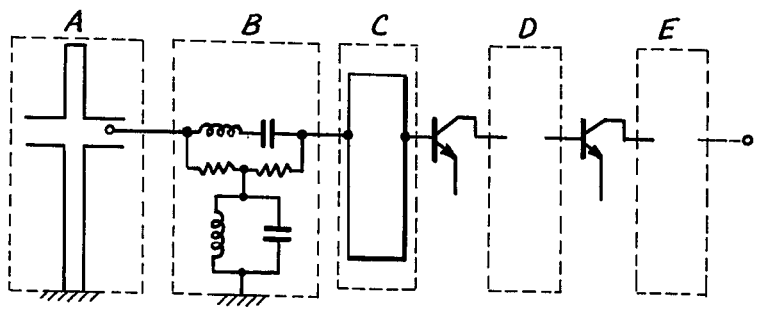
FIG. 2 is a block diagram of a transistor amplifier, in which an attenuation equalizer shown in FIG. 1 is used as a gain slope compensating circuit.
Figure 3:
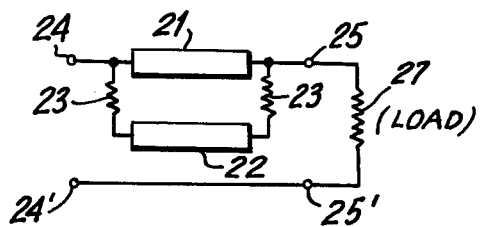
FIG. 3 is a circuit diagram of a first equivalent circuit of the invention.

FIG. 3 shows one of equivalent circuits of an attenuation equalizer having constant resistance according to the present invention, in which the respective opposite ends of two distributed constant lines 21, 22, having the same electrical length, are connected through resistors 23, while the opposite ends of the distributed constant line 21 are used as, or connected to, input and output terminals 24 and 25 of the equalizer, while the other terminals 24', 25' are usually connected to ground (common) potential.

Assume that the characteristic impedance and phaseshift of the distributed constant lines 21 and 22 are $Z_1$, $\theta_1$ and $Z_2$, $\theta_2$, respectively, that the resistance of the resistors 23 is equal to R, and that an external load impedance (output line characteristic impedance) 27 is $Z_L$. Where these values satisfy the following equations (1), (2) and (3), the impedance, as viewed from terminal 24 of the circuit of FIG. 3 towards the load side 27 becomes equal to the load impedance $Z_L$ over the whole frequency band. In other words, an attenuation equalizer has a constant resistance over the whole frequency band.

$$\theta_1 = \theta_2 = \theta \tag{1}$$

$$Z_1^2 = R \cdot Z_L^2/(R-Z_L) \tag{2}$$

$$Z_2^2 = R(R-Z_L) \tag{3}$$

The insertion loss $L(\theta)$ between the terminal 24 and the terminal 25 at this time is given as:

$$L(\theta) 32\ 10 \log (1 + [Z_L/(R-Z_L)] \cdot \sin^2\theta)\ (\text{dB}) \tag{4}$$

Thus, the insertion loss varies relative to frequency, according to a change in $\sin^2\theta$.

Figure 4:
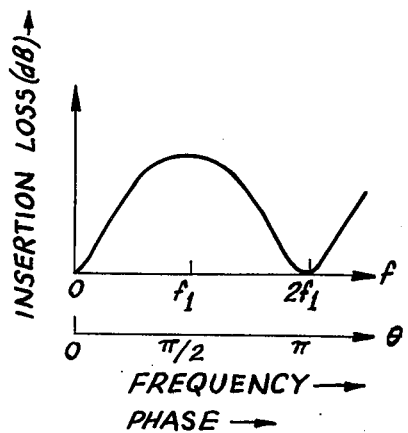
FIG. 4 is a graph showing a frequency characteristic of the insertion loss in a first equivalent circuit shown in FIG. 3.

FIG. 4 shows calcuated values of the frequency characteristics of the insertion loss $L(\theta)$. The phase shift provided by the distributed constant line 21 is $\pi/2$ at the frequency $f_1$, showing a maximum insertion loss at this frequency. In the case of a doubled frequency ($2f_1$), the insertion loss is nullified. In addition, at a high frequency range, the same characteristic may be periodically achieved at intervals of $2f_1$.

Figure 5:
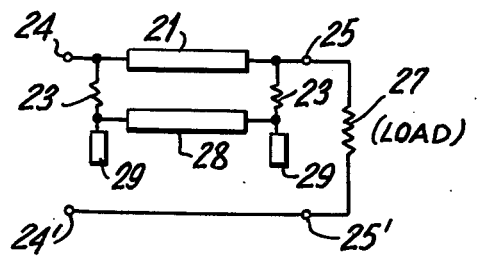
FIG. 5 is a circuit diagram of a second equivalent circuit of the invention.
Figure 6:
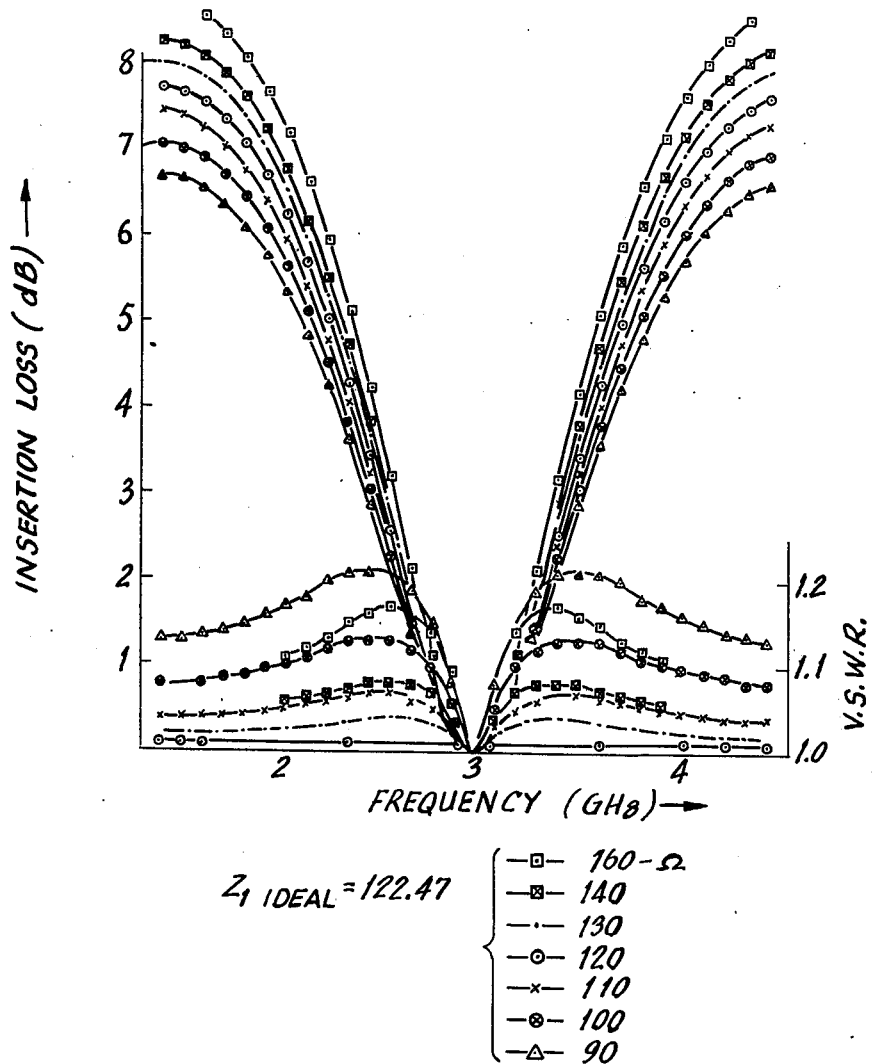
FIG. 6 is a graph showing insertion loss and V.S.W.R. of the equalizer circuit of FIG. 3 as a function of frequency with a parameter of the impedance $Z_1$ which is varied around its ideal value.
Figure 7:
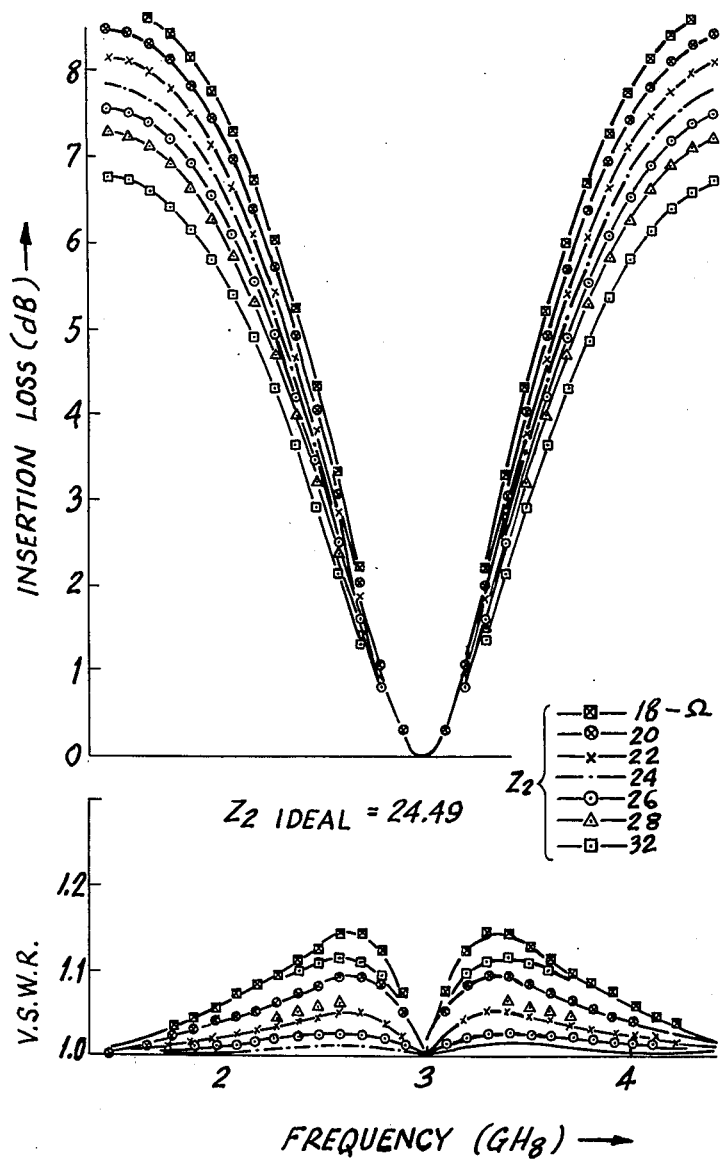
FIG. 7 is a graph showing variation in frequency characteristics of the insertion loss and V.S.W.R. of the circuit of FIG. 3, as the impedance $Z_2$ is varied around its ideal value.
Figure 8:
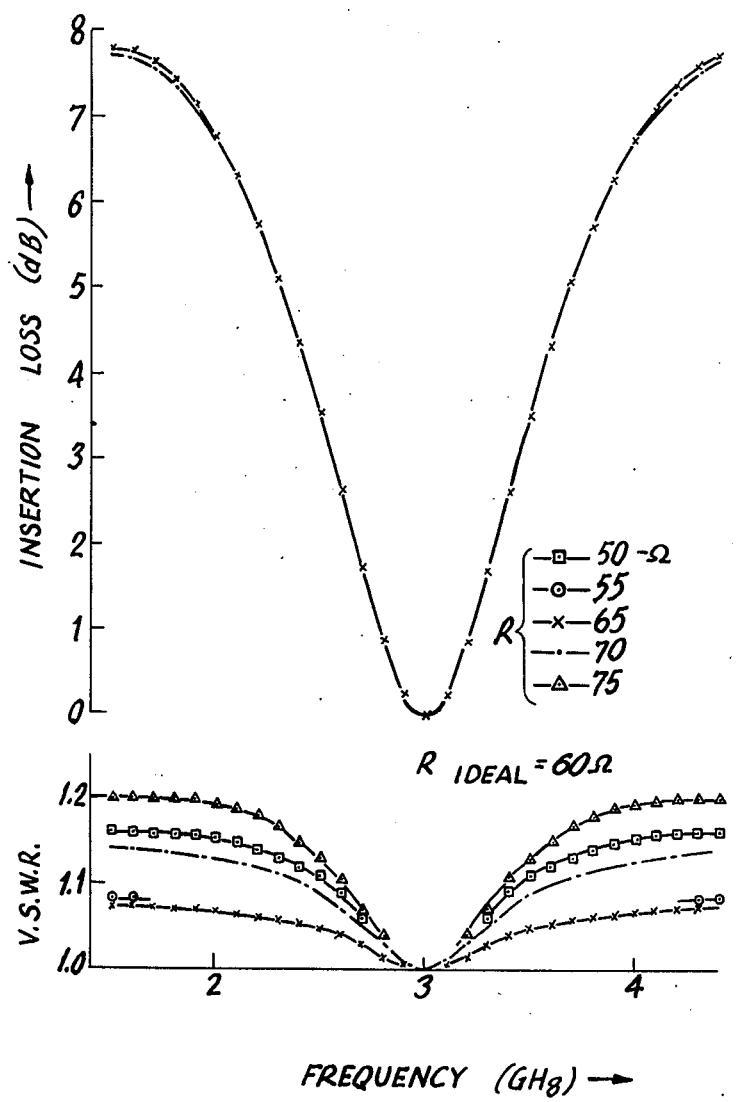
FIG. 8 is a graph showing variation in frequency characteristics of the insertion loss and V.S.W.R. circuit of FIG. 3, as the resistance R is varied around its ideal value.
Figure 9:
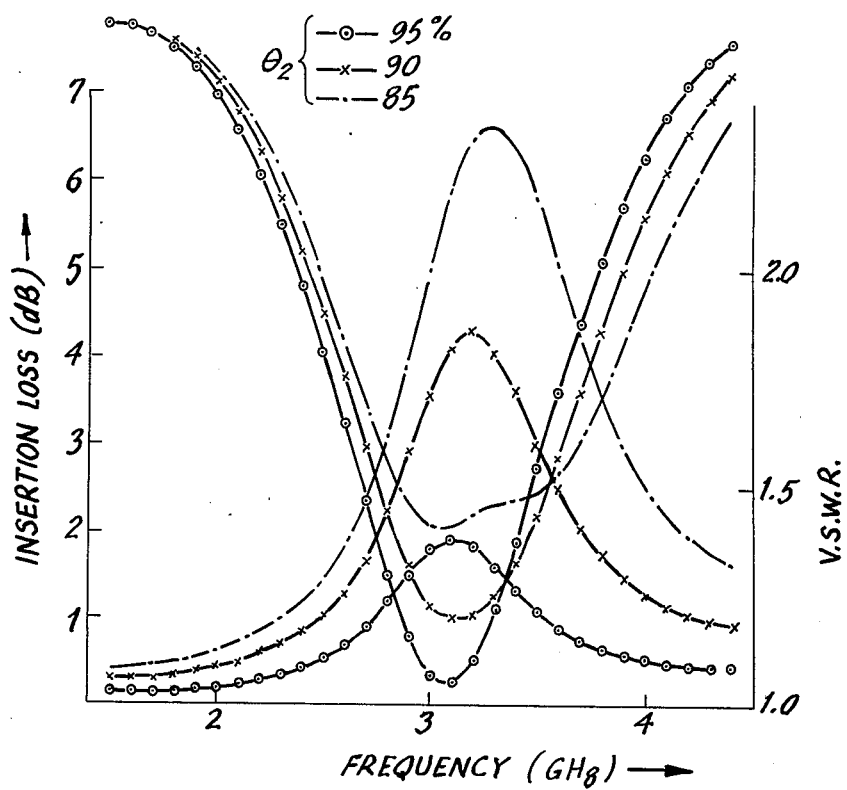
FIG. 9 is a graph showing variation in frequency characteristics of the insertion loss and V.S.W.R. of circuit of FIG. 3, as the electical length $\theta_2$ is varied.

FIG. 5 shows another equivalent circuit of the attenuation equalizer having a constant resistance according to the present invention, in which a distributed constant line 28, having an electrical length different from that of the distributed constant line 21, is used in place of distributed constant line 22 of FIG. 3. Stabs 29 are attached to the opposite ends of the distributed constant line 28. In this circuit, the characteristic impedances $Z_1$, $Z_2$ of the distributed constant lines 21, 28 and the resistance R of the resistor 23 follow the relationships defined by the equations (2), (3).

In the case where the electrical lengths of distributed constant lines 21 and 28 are not equal, there is no possibility of the voltage standing wave ratio (V.S.W.R.), at the input and output terminal 24, 25, being equal to 1.0 over the whole frequency band. For instance, in case the electrical length of the distributed constant line 28 is 10% less than that of the distributed constant line 21, and the stabs 29 are not used, then the maximum value of V.S.W.R. exceeds 1.8.

However, in this case as well, the addition of the capacitive stabs 29, of a suitable length, to the opposite ends of the line may improve the V.S.W.R. so as to be less than 1.03, and hence the equivalent circuit according to this embodiment may be regarded as a constant resistance circuit from the viewpoint of practical application.

In case the electrical length of distributed constant line 28 is longer than that of the line 21, then inductive stabs 29 are added to the opposite ends of the line, thereby compensating for the electrical length.

FIGS. 6, 7, 8, and 9 illustrate graphs showing the calculated values representing variations in insertion loss and V.S.W.R., when $Z_1$, $Z_2$, R and $\theta_2$ are varied around their ideal values as obtained from equations (1), (2), (3) in the circuit diagram of FIG. 3. In this example, the respective ideal values are as follows:

$Z_1 = 122.47\Omega$, $l_1 = 16.66$ mm, $Z_2 = 24.49\Omega$, $l_2 = 16.66$ mm, $R = 60\Omega$, and $Z_L = 50\Omega$. Minimum insertion loss frequency is 3GHz.

As can be seen from the graphs, in the case where the respective values of $Z_1$, $Z_2$, and R fall within a range of ±25%, as compared with their ideal values, then a V.S.W.R. of 1.2 is obtained, presenting no problem in a practical application. On the other hand if, it is necessary to limit the electrical length ($\theta_2$) to within ±5% from its ideal value it is effective to adjust the electrical length by means of stabs as shown in FIG. 5.

Figure 10:
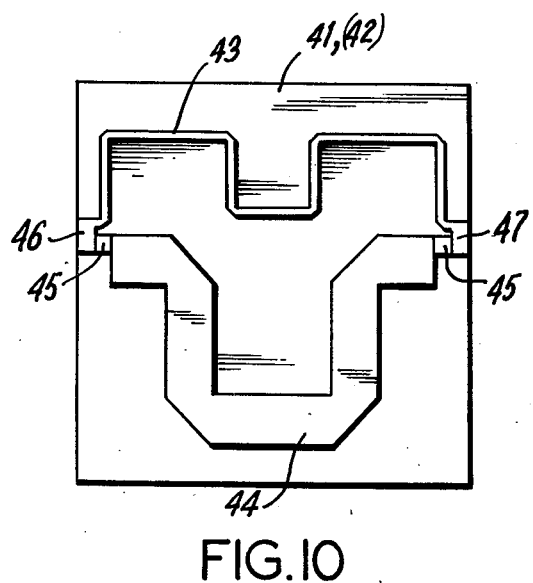
FIG. 10 is a plan view of the first embodiment of the invention.

FIG. 10 shows the first embodiment of the attenuation equalizer having a constant resistance according to the present invention, in which two distributed constant lines 43, and 44 have the same electrical length, resistors 45 consist of a $TaN_2$ thin film, and input and output terminals 46, 47 are formed on a dielectric plate 42 having a grounding conductor 41 bonded to the back surface thereof. Generally, the electrical length of resistor 45 is negiligibly small in comparison with that of the distributed constant lines 43 and 43. If the value of the electrical length of the resistor 44 is not negligible, the electrical length of line 45 should be shortened for compensation.

Figure 11:
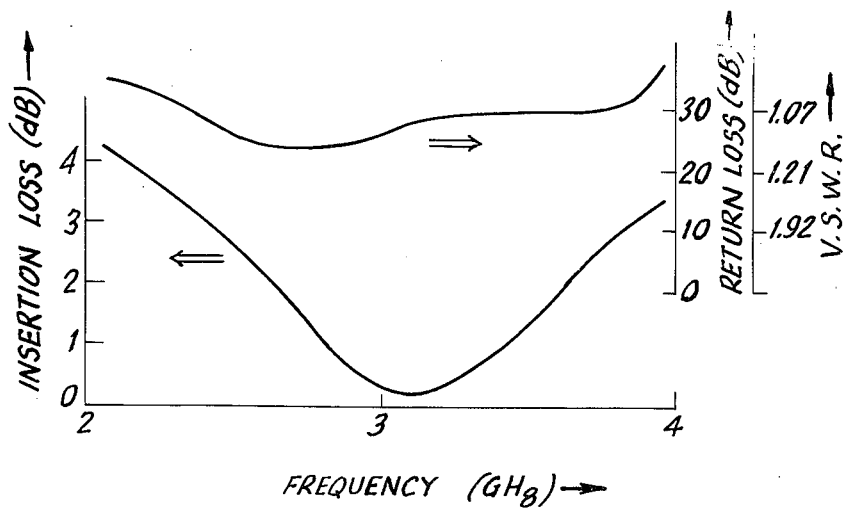
FIG. 11 is a graph representing test data of characteristics of the first embodiment shown in FIG. 10.

FIG. 11 shows measured characteristics of the first embodiment of the constant resistance circuit including TaCrAu evaporated thin film and $TaN_2$ thin film resistors, which are formed on an alumina substrate of dimensions of 15 × 15 × 1 mm according to photoetching process. The frequency of a minimum insertion loss is substantially in conformity with a design value, and the insertion loss at this frequency is as low as 0.2 dB, while V.S.W.R. at the input terminal 46 is less than 1.2 over the used bandwidth (2 ~ 4 GHz).

Figure 12:
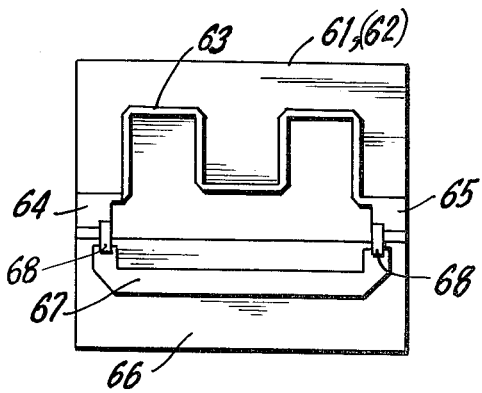
FIG. 12 is a plan view of a second embodiment of the invention.

FIG. 12 shows the second embodiment of an attenuation equalizer having a constant resistance according to the invetion, in which a line-conductor 63, having a given characteristic impedance and electrical length and an input and output is formed on a dielectric plate 62. A grounding conductor 61 is bonded to its back surface, while another line-conductor 67 having a given electrical length and impedance is formed on the top surface of another dielectric plate 66 having the dielectric constant larger than that of the dielectric plate 62. Grounding conductor 61 is boanded to the back surface, and then the opposite ends of the line-conductor 67 and input and output terminal conductors 64, and 65 are connected via respective tip resistors 68.

For increasing the insertion loss at the frequency $f_1$ shown in FIG. 4 according to the aforesaid operational principal, the line impedance of the line conductor 67 in this embodiment should be lowered a considerable amount. In order to lower the line impedance, the line conductor width should be increased but this results in a difficulty in bending the line to shorten the entire length thereof and also results in difficulty in reducing the size when using wide lines. Accordingly, a low impedance line is formed on a high dielectric-constant substrate 66 for shortening the propagation wave length, while the lines having a suitable width are provided for facilitating the connection of resistors 68 to the opposite ends of the line. In addition, tip resistors are separately prepared as two resistors, thereby dispensing with a high precision process required for the connection between the two dielectric plates 62 and 66. For instance, in the case where an ordinary alumina substrate is used in place of the dielectric substrate 62, and a high dielectric-constant substrate 66 is made of $(1-x)BaO\cdot x\, TiO_2$, ($x = 0.8$), then the specific dielectric constant of the substrate 66 remains at 39.2, so that the wave length in a microstrip line is shortened to about half of the wave length in the alumina substrate thereby, providing many advantages.

As is apparent from the foregoing description, according to this embodiment, two dielectric substrates having different dielectric constants are used, so that an attenuation equalizer having a constant resistance of a compact size may be manufactured with ease.

Figure 13:
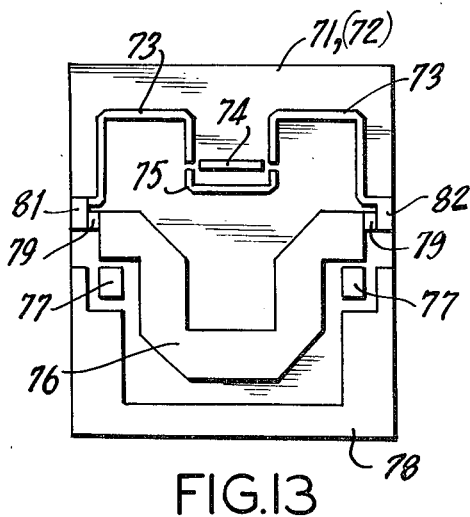
FIG. 13 is a plan view of a third embodiment of the invention.

FIG. 13 shows the third embodiment of an attenuation equalizer having constant resistance, in which there are formed on a dielectric plate 72 having a grounding conductor 71 bonded to the back surface thereof, main portions 73 of a first line conductor having a given impedance, auxiliary portions 74 and 75 for the first line conductor for use in varying the line length of the first line conductor, and a second line conductor 76 having a given impedance and electrical length. Also, stab lines 77, thin film resistors 79, and a grounding electrode 78 are formed at the opposite ends of the second line conductor 76, while input and output terminals 81 and 82 are formed at both ends of the first line conductor 73. The main portions of the first line conductor 73 are connected at their ends to the respective ends of one of the auxiliary portions 74 and 75 by bonding wires (not shown), while the ends of the second line conductor 76, stab lines 77 and grounding electrode 78 are respectively connected by bonding wires (not shown) to accommodate the inductance or capacitance, thereby improving the input and output V.S.W.R. In this manner, the entire electrical length can be changed by replacing the auxiliary line conductors 74, 75 to change $f_1$ shown in FIG. 4. In addition, it is apparent that an error in the manufacture, of the electrical length of the first and second parallel lines may be compensated for by means of stabs 77 provided at the opposite ends of the second line conductor 76. This therefore requires less precision in design and manufacturing accuracy.

According to the aforesaid operational principle, the attenuation equalizer having a constant resistance according to the invention may be applied not only to a microstrip line arrangement but also to a triplate line arrangement in a similar manner. Furthermore, an attenuation equalizer having a constant resistance according to the invention may be provided by using other transmission lines, such as a coaxial line or waveguide.

Figure 14:
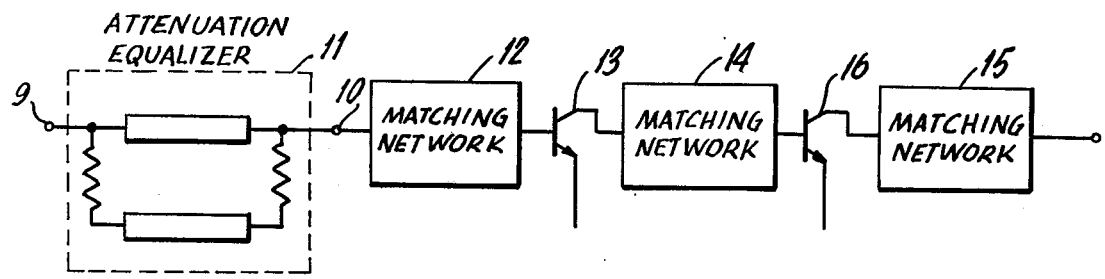
FIG. 14 is a block diagram of a transistor amplifier, in which an attenuation equalizer shown in FIG. 3 is used at the input side thereof as a gain slope compensating circuit.

FIG. 14 shows the block diagram of a transistor amplifier comprised of an attenuation equalizer 11 of the invention, matching networks 12, 14, 15 and transistors 13, 16. An output terminal 10 of the attenuation equalizer 11 is connected to an input terminal of the transistor 13 via the matching network 12 and an input terminal 9 of the attenuation equalizer 11 is an input terminal of the amplifier. Therefore, the input impedance of this amplifier can be maintained at a constant value of 50Ω at all used frequency bandwidths. In other words, input side V.S.W.R. of this amplifier can be maintained below 1.2 at all used frequency bandwidth, and the gain slope of the transistors 13 and 16 can be easily compensated by attenuation equalizer 11. Accordingly, there may be achieved a high output power transistor amplifier with flat gain and an output-power characteristic in a desired frequency band, while maintaining the optimum input and output impedances.

Figure 15:
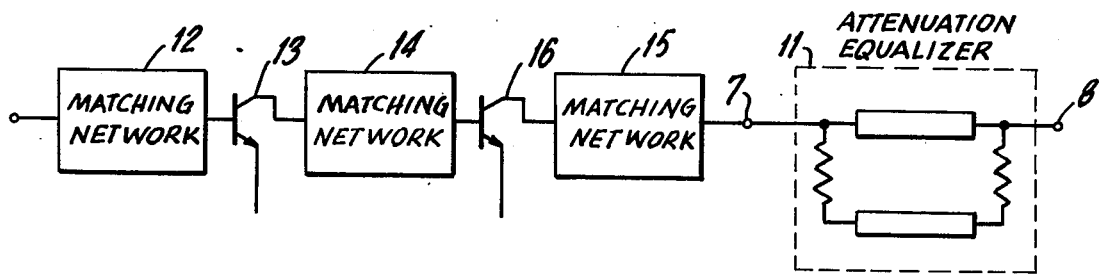
FIG. 15 is a block diagram of a transistor amplifier, in which an attenuation equalizer shown in FIG. 3 is used at the output side thereof as a gain slope compensating circuit.

FIG. 15 shows the block diagram of a transistor amplifier, in which an input terminal 7 of the attenuation equalizer 11 is connected to an output terminal of a transistor 16 via a matching network 15, and an output terminal 8 of the attenuation equalizer 11 is an output terminal of this amplifier. Therefore, the output impedance of this amplifier can be maintained constant. In other words, output side V.S.W.R. of this amplifier can be easily maintained below 1.2 at the used frequency bandwidths, and the gain slope of the output power of the transistor 16 can be compensated by the attenuation equalizer 11. This embodiment represents a two stage, low noise amplifier, in which the attenuation equalizer 11 is positioned on the output side, thereby providing a high frequency transistor amplifier having a flat gain in a desired frequency band, and good input and output impedances, without increasing the noise figure of the amplifier.

Figure 16:
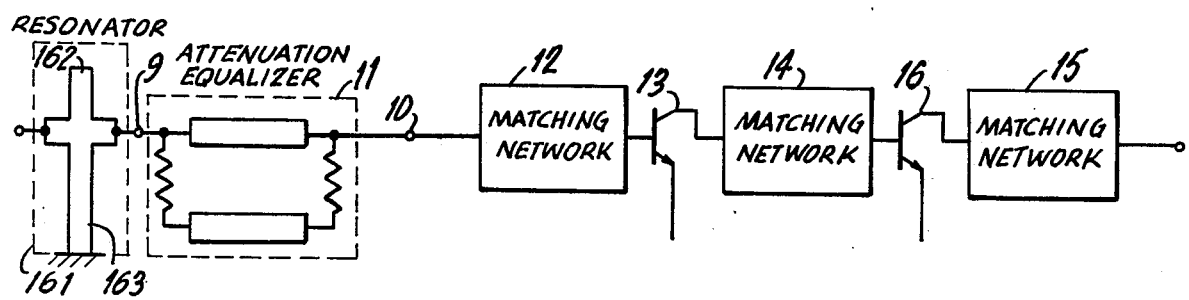
FIG. 16 is a block diagram of a transistor amplifier, in which an attenuation equalizer and a resonation are used as a gain slope compensating circuit.

FIG. 16 shows a block diagram of a transistor amplifier which adds a resonator 161 consisting of strip lines, to the input side of the amplifier shown in FIG. 14. It is known that this resonator provides parallel resonance, at a particular frequency, when the sum of the line lengths of an open stab 162 and a short stab 163 becomes equal to ¼ of a wave length. Accordingly, by bringing this resonance frequency into coincidence with an upper limit frequency of a desired frequency band, there may be achieved a gain-compensating circuit utilizing reflection. A change in the ratio of the length of the open stab 162 to that of the short stab 163 leads to a change in the reflection characteristics of the resonator 161. Accordingly, a gain slope may be finely adjusted by providing adjusting points which allow a change in this ratio. That is to say, attenuation equalizer 11 provides course compensation and resistor 161 provides fine compensation.

While a description has been given of a two-stage amplifier, it is apparent that an attenuation equalizer of the instant invention may be applied to more than two stages amplifiers. Moreover, the attenuation equalizer may be inserted between amplifier stages. If some equalizers are provided for each stage, then the compensation may be readily achieved.

In addition, in the case where the attenuation equalizer according to the invention is applied to an output circuit of an IMPATT diode oscillator and the like, loss is incurred at a second harmonic frequency and unwanted oscillation is suppressed.

Although a specific embodiment of this invention has been shown and described it will be understood that various modifications may be made without departing from the spirit of this invention.

I claim:

1. An attenuation equalizer having constant resistance comprising, a pair of input and output terminals, a first distributed constant line having a characteristic impedance $Z_1$ and an electrical length $\theta_1$ connected to said input and output terminals of said equalizer at both of its opposite ends respectively, a first resistor having resistance R connected to said input terminal at its one side, a second resistance R connected to said output terminal at its one side, and a second distributed constant line having a characteristic impedance $Z_2$ and an electrical length $\theta_2$ connected solely to the other side of said first resistor and the other side of said second resistor at both of its opposite ends respectively.

2. An attenuation equalizer having constant resistance of claim 1, in which one of said terminals is connected to load having impedance $Z_L$ and said values $Z_1$, $Z_2$ and R fall within a range of ±25% from values which satisfy the following equations:

$$Z_1^2 = R \cdot Z_L^2/(R-Z_L), \text{ and}$$

$$Z_2^2 = R(R-Z_L)$$

3. An attenuation equalizer having constant resistance of claim 1, in which $\theta_2$ falls within a range of ±5% from $\theta_1$.

4. An attenuation equalizer having a constant resistance of claim 1, in which said first and second distributed constant lines are microstrip lines formed on a dielectric substrate.

5. An attenuation equalizer having constant resistance of claim 5, in which said resistors are made of tandalum nitride formed on said dielectric substrate.

6. An attenuation equalizer having a constant resistance of claim 4, in which said resistors are externally attached tip resistors.

7. An attenuation equalizer having a constant resistance of claim 4, in which said first distributed line includes a plurality of auxiliary lines, one of which is employed in said distributed line so that said electrical length of said first distributed line is accommodated.

8. An attenuation equalizer having constant resistance of claim 1, in which said distributed constant lines may be coaxial lines.

9. An attenuation equalizer having a constant resistance of claim 1, in which said first and second distributed constant lines are microstrip lines formed on different dielectric substrates, respectively.

10. An attenuation equalizer having constant resistance of claim 1, in which said input terminal is connected to an output terminal of an amplifying element via a matching network.

11. An attenuation equalizer having constant resistance of claim 1, in which said output terminal is connected to an input terminal of an amplifying element via a matching network.

12. An attenuation equalizer having constant resistance of claim 1, in which said input terminal may be connected to an output terminal of an oscillator element.

13. An attenuation equalizer having constant resistance comprising a pair of input and output terminals, a first distributed constant line having a characteristic impedance $Z_1$ and an electrical length $\theta_1$, electrically connected to said input and output terminals at both of its opposite ends respectively, a first resistor having resistance R electrically connected to said input terminal at its one side, a second resistor having resistance R electrically connected to said to said output terminal at its one side, a first and a second stab electrically connected to the other side of said first resistor and the other side of said second resistor, respectively, and a second distributed constant line having a characteristic impedance $Z_2$ and electrical length $\theta_2$ having one end connected solely to the junction of said first resistor and said first stab and the opposite end connected solely to the junction of said second resistor and said second stab.

14. An attenuation equalizer having constant resistance of claim 13, in which one of said terminals is connected to load having impedance $Z_L$ and said values $Z_1$, $Z_2$ and R fall within a range of ±25% from values which satisfy the following equations:

$$Z_1^2 = R \cdot Z_L^2/(R-Z_L), \text{ and}$$

$$Z_2^2 = R(R-Z_L).$$

15. An attenuation equalizer having constant resistance of claim 13, in which $\theta_2$ falls within a range of ±5% from $\theta_1$.

16. An attenuation equalizer having a constant resistance of claim 13, in which said first and second distributed constant lines are micro-strip lines formed on a dielectric substrate.

17. An attenuation equalizer having a constant resistance of claim 16, in which said resistors are made of tandalum nitride formed on said dielectric substrate.

18. An attenuation equalizer having a constant resistance of claim 16, in which said resistors are externally attached tip resistors.

19. An attenuation equalizer having a constant resistance of claim 16, in which said first distributed line includes a plurality of auxiliary lines, one of which is employed in said distributed line so that said electrical length of said first distributed line is accommodated.

20. An attenuation equalizer having a constant resistance of claim 13, in which said first and second distributed constant lines may be coaxial lines.

21. An attenuation equalizer having a constant resistance of claim 13, in which said first and second distributed constant lines are micro-strip lines formed on different dielectric substrates, respectively.

22. An attenuation equalizer having constant resistance of claim 13, in which said input terminal is connected to an output terminal of an amplifying element via a matching network.

23. An attenuation equalizer having constant resistance of claim 13, in which said output terminal is connected to an input terminal of an amplifying element via a matching network.

24. An attenuation equalizer having constant resistance of claim 13, in which said input terminal is connected to an output terminal of an oscillator element.

* * * * *

UNITED STATES PATENT OFFICE
CERTIFICATE OF CORRECTION

Patent No. 4,118,672          Dated   October 3, 1978

Inventor(s) Tsutomu Noguchi

It is certified that error appears in the above-identified patent and that said Letters Patent are hereby corrected as shown below:

Please change the Assignee to read:

Nippon Electric Co., Ltd.,

Please show Claim 5 to be dependant upon claim 4.

Signed and Sealed this

Thirtieth Day of January 1979

[SEAL]

Attest:

RUTH C. MASON
Attesting Officer

DONALD W. BANNER
Commissioner of Patents and Trademarks